(12) United States Patent
Kaneko et al.

(10) Patent No.: US 6,696,812 B2
(45) Date of Patent: Feb. 24, 2004

(54) CONTROL APPARATUS FOR ELECTRIC MOTOR

(75) Inventors: Satoru Kaneko, Urizura (JP); Ryoso Masaki, Hitachi (JP); Yasuo Morooka, Hitachi (JP); Mitsuyuki Hombu, Hitachinaka (JP); Hiroshi Katayama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 138 days.

(21) Appl. No.: 09/956,251

(22) Filed: Sep. 20, 2001

(65) Prior Publication Data

US 2002/0163319 A1 Nov. 7, 2002

(30) Foreign Application Priority Data

Apr. 11, 2001 (JP) .......................................... 2001-112137

(51) Int. Cl.[7] .................................................. H02P 7/36
(52) U.S. Cl. ........................ 318/700; 318/711; 318/715; 318/720; 318/721; 318/722
(58) Field of Search ................................. 318/700, 720, 318/721, 722, 715, 711

(56) References Cited

U.S. PATENT DOCUMENTS

| | | | | |
|---|---|---|---|---|
| 5,051,680 A | * | 9/1991 | Belanger | 318/701 |
| 5,969,496 A | | 10/1999 | Yamada et al. | 318/715 |
| 6,163,127 A | * | 12/2000 | Patel et al. | 318/700 |
| 6,281,656 B1 | * | 8/2001 | Masaki et al. | 318/700 |
| 6,501,243 B1 | * | 12/2002 | Kaneko et al. | 318/700 |
| 6,586,903 B2 | * | 7/2003 | Moriarty | 318/701 |
| 2001/0002784 A1 | * | 6/2001 | Masaki et al. | 318/727 |

* cited by examiner

Primary Examiner—Rita Leykin
(74) Attorney, Agent, or Firm—Crowell & Moring LLP

(57) ABSTRACT

A control apparatus controls a voltage applied to an AC motor from a power converter with a PWM signal, and has two different magnetic pole position-estimating units which estimate a rotor magnetic pole position of the AC motor, and has a switching unit which selects any one of these two kinds of magnetic pole position-estimating units.

27 Claims, 10 Drawing Sheets

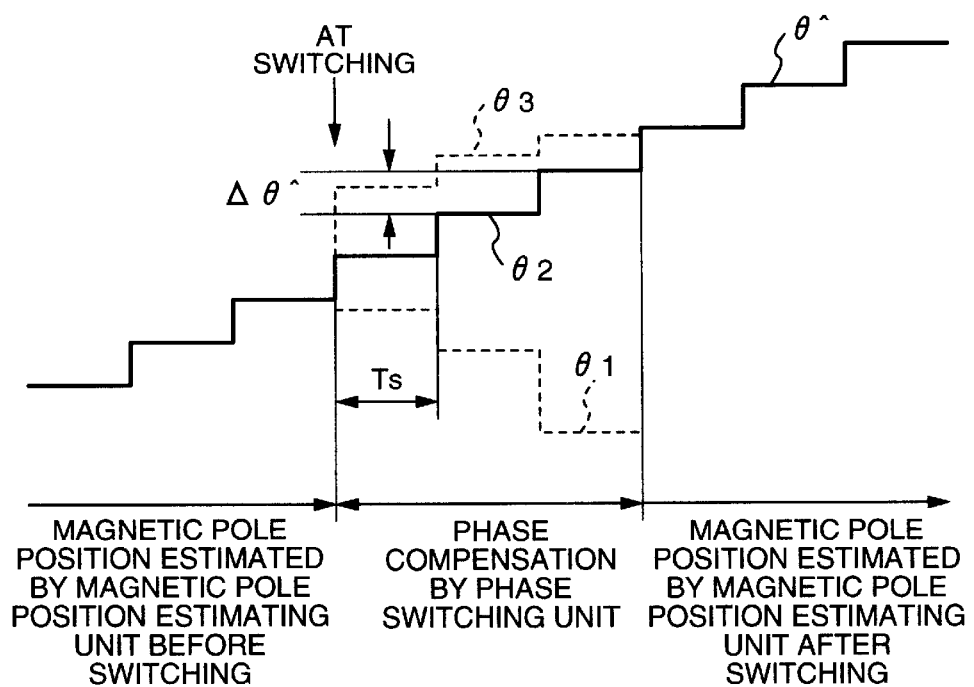
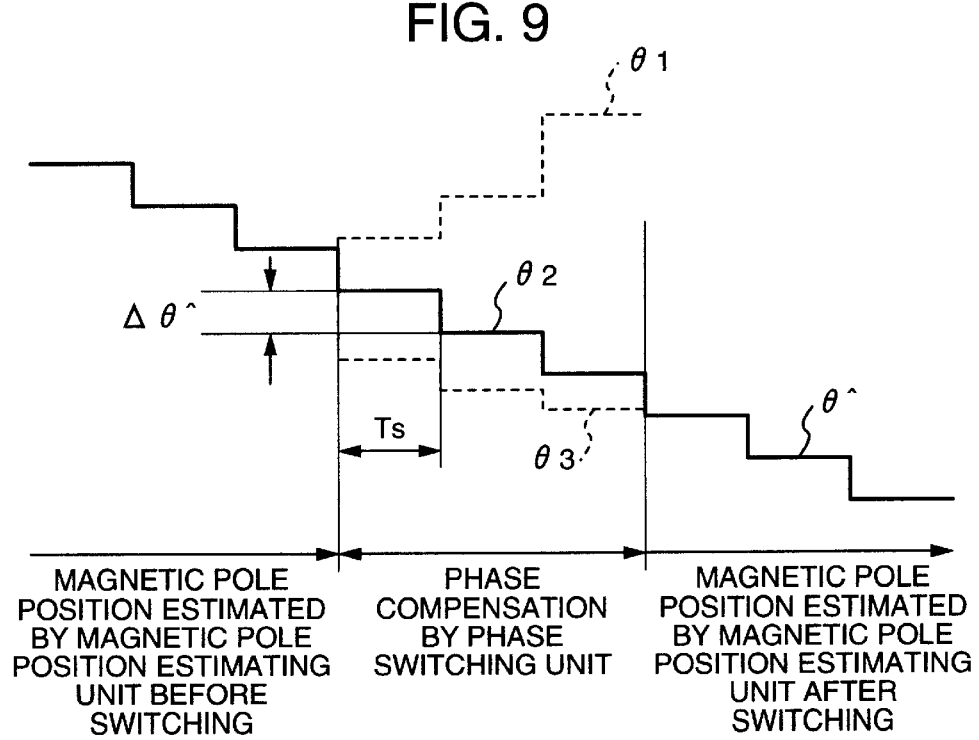

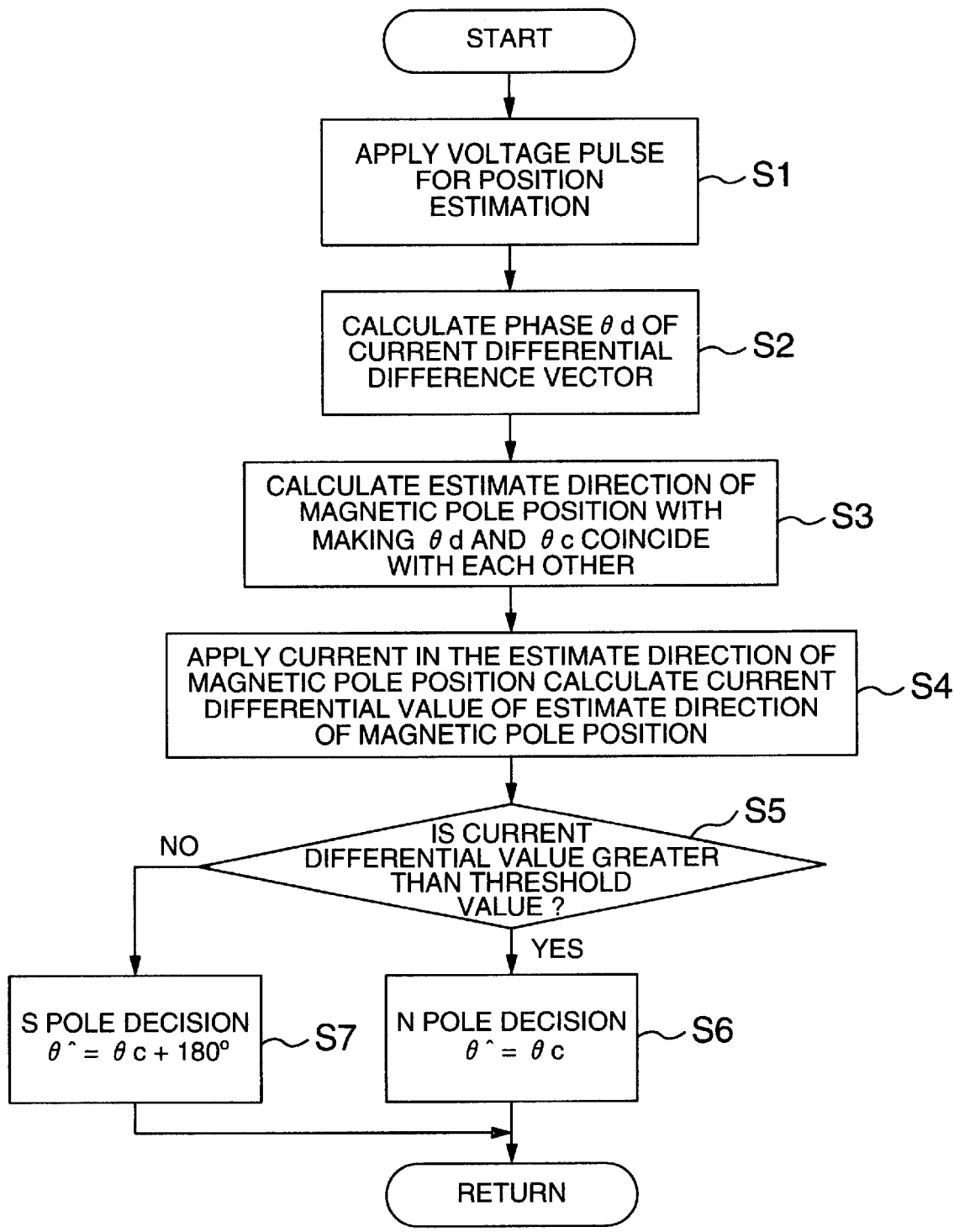

CONTROL APPARATUS FOR ELECTRIC MOTOR

BACKGROUND OF THE INVENTION

The present invention relates to a control apparatus for a motor that detects a magnetic pole position of a rotor and controls an AC motor without using a position sensor.

In order to control the speed and torque of an AC motor in high speed response, it is necessary to detect or estimate a magnetic pole position of a rotor. Various types of so-called magnetic pole position sensorless control systems that each detect a magnetic pole position of a rotor and control an AC motor without using any position sensor are proposed in recent years. Also among these systems, a system using an induced voltage which the AC motor generates, a system using an electrical potential difference equation of the AC motor, a system using the inductance characteristics of the AC motor, or the like is known as a magnetic pole position sensorless control system for a salient pole type AC motor.

For example, a magnetic pole position sensorless control system where two different magnetic pole position-estimating methods are combined is disclosed in U.S. Pat. No. 5,969,496 by Yamada et al. issued Oct. 19, 1999. This method tries the detection of a magnetic pole position by a first detection method that has a practical position detection precision, when a motor is rotating above a predetermined rotation speed. If position detection is not successful, this method detects a magnetic pole position by a second detection method that can perform position detection at under a predetermined rotation speed. Moreover, the rotation speed of the rotor of the motor is detected and one method is selected from the first and second detection methods according to the magnitude of this rotation speed.

Although the principles of two electrical angle detection methods are explained in the above-described conventional technique in detail. However, as for a switching method of two electrical angle detection methods, there is only the description of selecting one from between the first and second detection methods according to a state of a rotation speed. Before and after the switching of the two electrical angle detection methods, the phase difference between magnetic pole position estimates may arise, and torque change may arise in the motor. However, in the conventional technology, this point is not taken into consideration at all.

Moreover, in a conventional technology, an electrical angle is detected with the first detection method, which has a practical position detection precision at a predetermined rotation speed or faster, immediately after the startup of the motor. The rotation speed of the motor is obtained on the basis of a change of the electrical angle detected. However, immediately after the startup of the motor, when the rotation speed of the motor is below a predetermined rotation speed including the time of stopping, a rotation speed is obtained on the basis of a detected value of an electrical angle including an error. Hence the rotation speed obtained may include an error.

Moreover, in the conventional technology, control process routines of the motor are different at the time of the startup of the motor and at the time of usual operation. Hence the configuration of a control apparatus for the motor becomes complicated.

SUMMARY OF THE INVENTION

A typical object of the present invention is to provide a control apparatus for a motor that can estimate a rotor magnetic pole position of the motor in high speed response, high precision, and highly efficiency throughout the entire operating range of the motor.

Fundamental characteristics of the present invention are to estimate a rotor magnetic pole position of an AC motor with at least two different magnetic pole position-estimating methods, to switch at least two magnetic pole position-estimating methods according to an operating state of the AC motor throughout an operating range of the AC motor, and to estimate the rotor magnetic pole position of the AC motor.

One of at least two magnetic pole position-estimating methods is a carrier synchronization type estimating method of a magnetic pole position on the basis of a detected current value of the AC motor that is detected by synchronizing with a carrier of a PWM signal. Another method of at least two magnetic pole position-estimating methods is an equal potential type estimating method of a magnetic pole position on the basis of a detected current value of the AC motor detected in an equal potential state of the AC motor.

The carrier synchronization type magnetic pole position-estimating method is used in a low speed period including a startup period and a stop period of a motor, and the equal potential type magnetic pole position-estimating method is used for an AC motor at a middle and high speed. It is preferable to calculate a rotor magnetic pole position of the AC motor on the basis of an operating state of the AC motor in a predetermined period at the time of switching the a carrier synchronization type magnetic pole position-estimating method and the equal potential type magnetic pole position-estimating method. Alternatively, it is preferable to limit a variation amount of a rotor magnetic pole position of the AC motor estimated with the magnetic pole position-estimating method after switching on the basis of an operating state of the AC motor in a predetermined period. Alternatively, it is preferable to change the current detection timing of the AC motor. Alternatively, it is preferable to estimate a rotor magnetic pole position of the AC motor by using at least two magnetic pole position-estimating methods within a predetermined speed range of the AC motor.

Moreover, in the carrier synchronization type magnetic pole position-estimating method, it is preferable to discriminate whether the direction of a rotor magnetic pole position is the direction of a north pole or the direction of a south pole with estimating the direction of a rotor magnetic pole position of the AC motor at the time of the startup of the AC motor. The polarity discrimination of this rotor magnetic pole position can be performed on the basis of a variation amount of the motor current every fixed time that is generated by applying a predetermined amplitude of current in the estimated direction of the rotor magnetic pole position. Alternatively, the polarity discrimination can be performed on the basis of the detected current value of the AC motor detected in an equal potential state of the AC motor.

The present invention has at least two different magnetic pole position-estimating methods, and estimates a magnetic pole position of the AC motor by switching magnetic pole position-estimating means corresponding to each of a plurality of operating states of the AC motor. It is possible to estimate a magnetic pole position of the AC motor with the always-optimum magnetic pole position-estimating method.

Here, the followings are typical embodiments of the present invention.

A first form is a control apparatus for a motor that controls a voltage applied to an AC motor from a power converter by a PWM signal, the control apparatus for a motor which estimates a rotor magnetic pole position of the above-described AC motor with at least two different magnetic pole position-estimating methods, and estimates the rotor magnetic pole position of the above-described AC motor by switching the above-described at least two magnetic pole position-estimating methods according to an operating state of the above-described AC motor throughout an operating range of the above-described AC motor.

A second form is a control apparatus for a motor that controls a voltage applied to an AC motor from a power converter by a PWM signal, the control apparatus for a motor which estimates a rotor magnetic pole position of the above-described AC motor with a magnetic pole position-estimating method based on a detected current value of the above-described AC motor detected by at least synchronizing with a carrier of the above-described PWM signal, and a magnetic pole position-estimating method based on a current value of the above-described AC motor detected in a equal potential state of the above-described AC motor, and estimates a rotor magnetic pole position of the above-described AC motor with switching the above-described at least two magnetic pole position-estimating methods according to an operating state of the above-described AC motor throughout an operating range of the above-described AC motor.

A third form is a control apparatus for a motor that controls a voltage applied to an AC motor from a power converter by a PWM signal, the control apparatus for a motor which has: carrier synchronization type position-estimating means for estimating a rotor magnetic pole position of the above-described AC motor on the basis of a detected current value of the above-described AC motor detected by synchronizing with a carrier of the above-described PWM signal; equal potential type position-estimating means for estimating a rotor magnetic pole position of the above-described AC motor on the basis of a current value of the above-described AC motor detected in an equal potential state of the above-described AC motor; and means for switching magnetic pole position-estimating means from between the above-described carrier synchronization type position-estimating means and above-described equal potential type position-estimating means throughout an operating range of the above-described AC motor according to an operating state of the above-described AC motor.

A fourth form is a control apparatus for a motor that estimates a rotor magnetic pole position of an AC motor mounted in a vehicle, and controls the AC motor, the control apparatus for a motor which applies a signal for a rotor magnetic pole position estimation of the above-described AC motor to a control commander of the above-described AC motor in a low speed period including a startup period and a stop period of the above-described vehicle, inputs the current of the above-described AC motor, estimates a rotor magnetic pole position of the above-described AC motor by obtaining a current differential value by applying the above-described signal for an rotor magnetic pole position estimation, and estimates the rotor magnetic pole position of the above-described AC motor on the basis of an induced voltage of the above-described AC motor in a middle and high speed period of the above-described vehicle.

A fifth form is an electric vehicle having an AC motor which drives wheels, a vehicle-mounted power source, a power converter which converts into alternating current power the direct current power supplied from an on board power supply, and supplies the alternating current power to the above-described AC motor, and a control apparatus which controls the power converter, the electric vehicle where the above-described control apparatus is any one of the control apparatus described above.

A sixth form is an electric vehicle having an internal combustion engine which drives either of front or rear wheels, an AC motor which drives the other wheels, a vehicle-mounted power supply, a power converter which converts into alternating current power the direct current power supplied from the on board power supply, and supplies the alternating current power to the above-described AC motor, and a control apparatus which controls the power converter, the electric vehicle where the above-described control apparatus is any one of the control apparatuses described above.

BRIEF DESCRIPTION OF THE DRAWINGS

FIG. 8 is a chart showing an output of an magnetic pole position estimate $\theta^{\wedge}$ in a phase-switching unit shown in FIG. 1, and is an example of the output at the time of acceleration;

FIG. 9 is a chart showing an output of an magnetic pole position estimate OA in a phase-switching unit shown in FIG. 1, and is an example of the output at the time of deceleration;

FIG. 10 is a flow chart showing an operation in a startup period in a carrier synchronization type magnetic pole position-estimating unit shown in FIG. 1;

DESCRIPTION OF THE EMBODIMENTS

[Embodiment 1]

Figure 1:
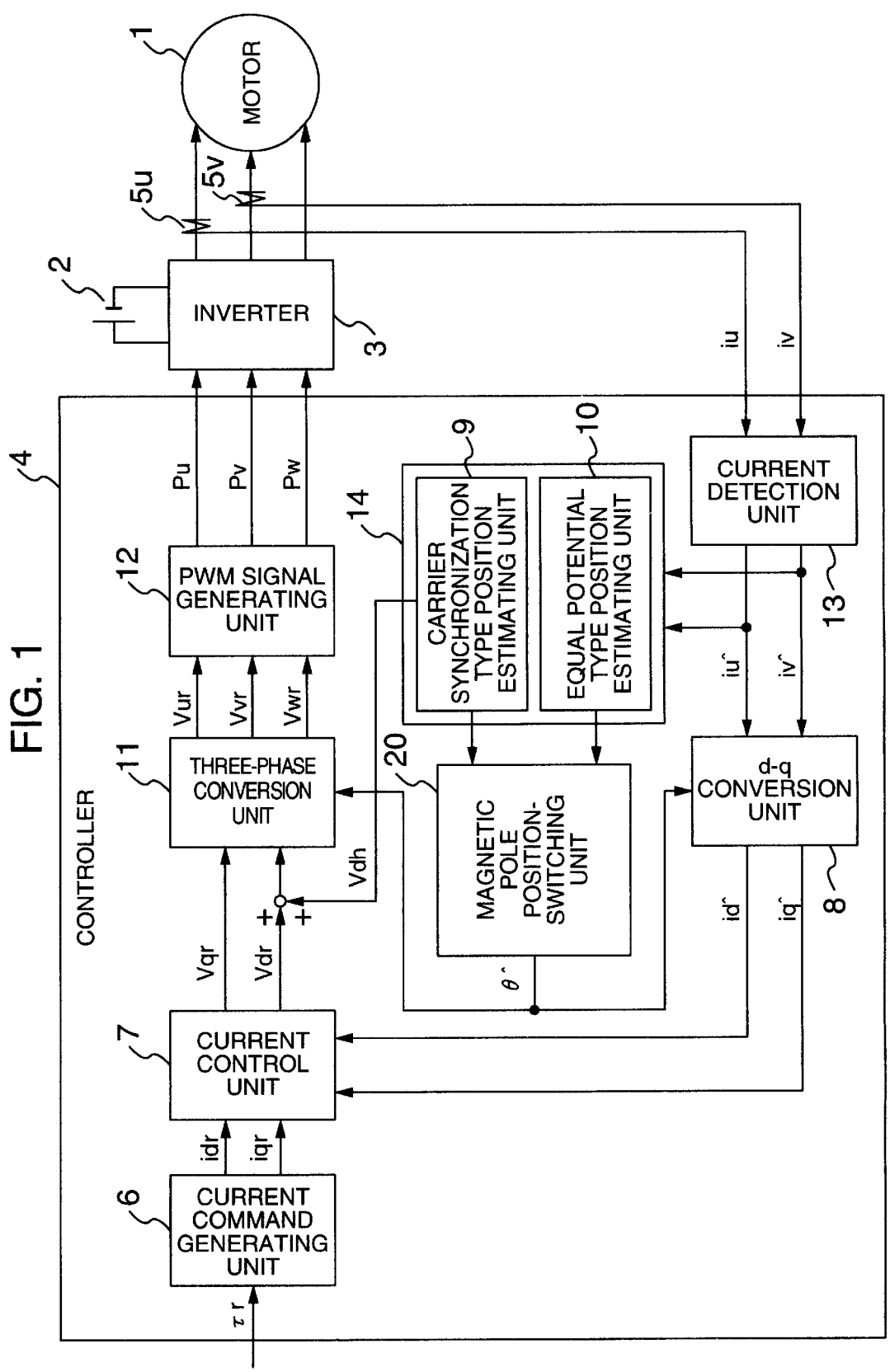
FIG. 1 is a block diagram showing a configuration of a control apparatus for a motor that is a first embodiment of the present invention.

A first embodiment of the present invention will be described on the basis of FIGS. 1 to 13. FIG. 1 shows a configuration of a motor control apparatus of a first embodiment. A motor control apparatus of this embodiment controls an AC motor by estimating a rotor magnetic pole position of an AC motor without using any position sensor, and has carrier synchronization type position-estimating means and equal potential type position-estimating means as rotor magnetic pole position-estimating means.

In addition, in these embodiments, examples that this apparatus is applied to a synchronous motor, which has a rotor where a plurality of permanent magnets are embedded in a rotor core and is mounted in an electric automobile such as an electric car and a hybrid car will be described. However, this apparatus is also applicable to other types of AC motors and AC motors used in other areas. Here, the electric car means a vehicle having an electric motor which is the only-driving source supplied with electric power from an on board power supply. The hybrid car means a vehicle that has an electric motor driven by an on board power supply, and an internal combustion engine as the driving sources.

Reference numeral 1 in this drawing denotes a synchronous motor. A DC voltage of a battery 2 is applied to the synchronous motor 1 after being converted into three-phase AC voltage with a predetermined value by an inverter 3 that is a power converter. PWM signals Pu, Pv and Pw outputted from a motor control apparatus 4 (hereafter, a control apparatus 4) are inputted into the inverter 3. The inverter 3 is controlled on the basis of these PWM signals Pu, Pv and Pw, and converts a DC voltage of the battery 2 into three-phase AC voltage of a predetermined value. According to general classification, the control apparatus 4 is constituted by a current command value generating unit 6, a current control unit 7, a three-phase transducer 11, a PWM signal generating unit 12, a magnetic pole position-estimating unit 14, a magnetic pole position-switching unit 20, a d-q transducer 8, and a current detecting unit 13. Furthermore, the magnetic pole position-estimating unit 14 consists of a carrier synchronization type magnetic pole position-estimating unit 9 and an equal potential type magnetic pole position-estimating unit 10.

If being generated, a torque command value τr is inputted into the current command value-generating unit 6. The current command value-generating unit 6 outputs a d-axis current command value idr and a q-axis current command value iqr on the basis of the torque command value τr inputted. The d-axis current command value idr and the q-axis current command value iqr that are outputted are inputted into the current control unit 7. The current control unit 7 outputs the d-axis voltage command value vdr and the q-axis voltage command value vqr on the basis of the d-axis current command value idr and the q-axis current command value iqr, which are inputted, and the detected d-axis current value id^ and the detected q-axis current value iq^ which are outputted from the d-q transducer 8.

A voltage pulse vdh outputted by the carrier synchronization type magnetic pole position-estimating unit 9 which will be described later is added to the q-axis voltage command value vqr outputted. The d-axis voltage command value vdr, which is outputted, and the q-axis voltage command value vqr to which the voltage pulse vdh is added are inputted into the three-phase transducer 11. The three-phase transducer 11 outputs a u-phase voltage command value vur, a v-phase voltage command value vvr, and a w-phase voltage command value vwr on the basis of the d-axis voltage command value vdr and the q-axis voltage command value vqr, which are inputted, and an estimated magnetic pole position θ^ outputted from the magnetic pole position-switching unit 20.

The u-phase voltage command value vur, v-phase voltage command value vvr, and w-phase voltage command value vwr which are outputted are inputted into the PWM signal generating unit 12. The PWM signal generating unit 12 outputs PWM signals Pu, Pv and Pw on the basis of the u-phase voltage command value vur, v-phase voltage command value vvr, and w-phase voltage command value vwr that are inputted. The PWM signals Pu, Pv and Pw are inputted into an inverter 3 as described above. The inverter 3 converts a DC voltage of the battery 2 into the three-phase AC voltage with a predetermined value on the basis of the PWM signals Pu to Pw inputted and outputs the three-phase AC voltage. The three-phase AC voltage outputted is applied to the synchronous motor 1.

The current detecting unit 13 accepts as inputs a u-phase current value iu, detected by a current sensor 5u, and a v-phase current value iv detected by a current sensor 5v. On the basis of these u-phase current value iu and v-phase current value iv that are inputted, the current detecting unit 13 outputs a detected u-phase current value iu^ and a detected v-phase current value iv^. The detected u-phase current value iu^ and detected v-phase current value iv outputted are inputted into the d-q transducer 8. The d-q transducer 8 outputs the detected d-axis current value id^ and the detected q-axis current value iq^ on the basis of the detected u-phase current value iu^ and the detected v-phase current value iv^ which are input, and the magnetic pole position estimate θ^ outputted from the magnetic pole position-switching means 20. The detected d-axis current value id^ and the detected q-axis current value iq^ which are outputted are inputted namely, fed back to the current control unit 7 as described above. Thus, the control apparatus 4 of this embodiment consists of current control systems that used the d-q axes.

Figure 2:
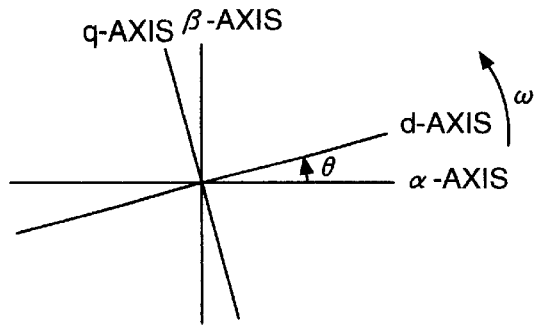
FIG. 2 is a diagram showing a relationship between a rotary coordinate system (d-q axes) and a static coordinate system (α-β axes)

FIG. 2 shows a relationship between a rotary coordinate system (d-q axes) and a static coordinate system (α-β axes). Here, the d-axis is a rotary coordinate axis that shows the direction of a magnetic pole position (magnetic flux), and the q-axis is a rotary coordinate axis that shows the direction that perpendicularly intersects with the d-axis electrically. When a motor that has a rotor in which a permanent magnet is embedded rotates at angular velocity ω, d-q axes also rotate with the angular velocity ω. Hence, in order to perform current control using d-q axes, it is necessary to detect a phase from a static coordinate system (α-β axes) to a rotary coordinate system (d-q axes), that is, a magnetic pole position θ of the rotor. The control apparatus 4 of this embodiment controls a synchronous motor 1 on the basis of this principle. The control apparatus 4 detects the current of the synchronous motor 1 and estimates a magnetic pole position θ to realize good current control also in all the operating range (or, operating states) of the synchronous motor 1. In addition, although the case where two phases of the u-phase and v-phase are detected as current of the synchronous motor 1 is described in this embodiment, three phases including the w-phase can be detected.

In order to give good characteristics in all aspects such as precision, responsiveness, effectiveness, and noise, in all the operating range (or, operating states) of the synchronous motor 1, two kinds of magnetic pole position-estimating units constitute the magnetic pole position-estimating unit 14 in this embodiment. Thus, the magnetic pole position-estimating unit 14 is constituted by the carrier synchronization type magnetic pole position-estimating unit 9 and equal potential type magnetic pole position-estimating unit 10. The carrier synchronization type magnetic pole position-estimating unit 9 is applied in a low speed rotation region including a startup period (startup period of the control apparatus 4) and a stop period of the synchronous motor 1. In addition, the equal potential type magnetic pole position-estimating unit 10 is applied in a middle and high speed rotation region of the synchronous motor 1. The carrier synchronization type magnetic pole position-estimating unit 9 and the equal potential type magnetic pole position-estimating unit 10 are switched and are made to operate by the magnetic pole position-switching unit 20 according to the above-described operating states of the control apparatus 4 and synchronous motor 1.

Figure 3:
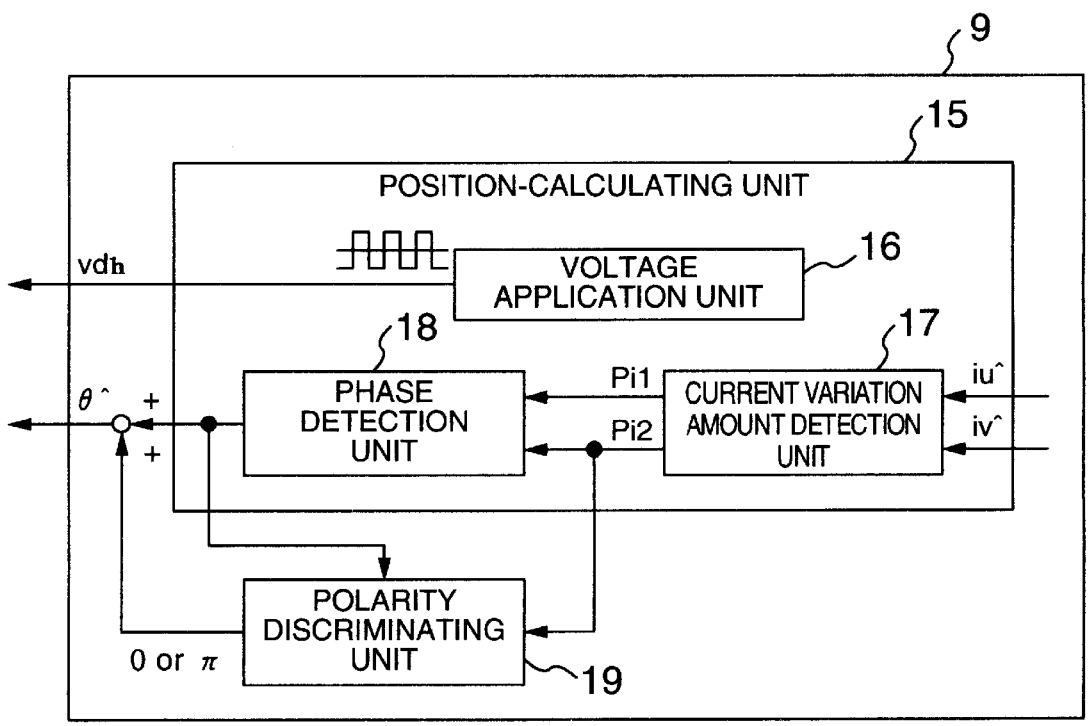
FIG. 3 is a block diagram showing a configuration of a carrier synchronization type position-estimating unit shown in FIG. 1.

FIG. 3 shows the configuration of the carrier synchronization type magnetic pole position-estimating unit 9. The carrier synchronization type magnetic pole position-estimating unit 9 consists of a position-calculating unit 15 and a polarity discriminating unit 19. The position-calculating unit 15 is based on the principle of the saliency (Ld≠Lq) of a synchronous motor. The position calculating unit 15 applies the voltage pulse vdh in the direction of the d-axis of the control system (θc) (the direction of the magnetic pole position estimate θ^, and estimate a magnetic pole position of the synchronous motor 1 on the basis of the detected u-phase current value iu^ and v-phase current detection value iv^ which are outputted from the current detecting unit 13.

Figure 4:
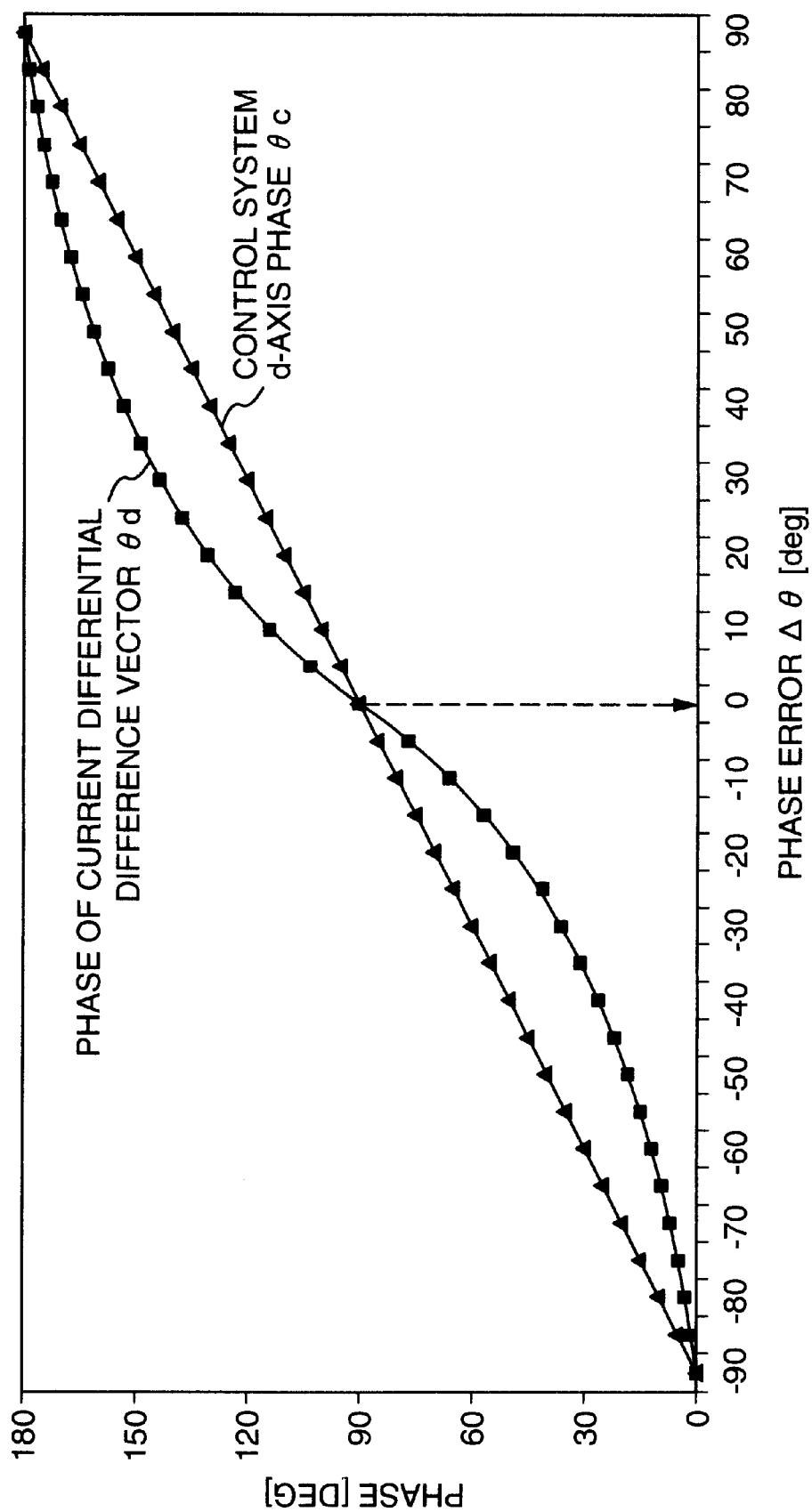
FIG. 4 is a graph showing a relationship between a vector phase $\theta d$ of a current differential difference and a phase $\theta c$ of the d-axis in a control system.

Here, the difference between the current differential values in plus and minus potential sections of a pulse generated by the application of the voltage pulse vdh (hereafter simply referred to as current differential difference) is expressed as a vector. Then, the relationship between the phase θd of the current differential difference vector and the phase θc of the d-axis in the control system becomes as shown in FIG. 4. As apparent from FIG. 4, by making a phase θd of the current differential difference vector, generated by application of voltage pulse vdh, coincide with a phase θc of the d-axis in the control system, the difference between the magnetic pole position θ of the motor and the phase θc of the d-axis of the control system, that is, a position error Δθ becomes 0. Hence the magnetic pole position can be estimated. This embodiment performs the magnetic pole position estimation with using this principle.

The position-calculating unit 15 consists of a voltage application unit 16, a current variation amount-detecting unit 17, and a phase detecting unit 18. The voltage application unit 16 generates the voltage pulse vdh (square wave), and applies the generated voltage pulse vdh to the d-axis voltage command value vdr. The current variation amount-detecting unit 17 detects and outputs a motor current differential vector Pi1 in a plus potential section, and a motor current differential vector Pi2 in a minus potential section, which is generated by application of the voltage pulse vdh, on the basis of the detected u-phase current value iu^ and detected v-phase current value iv^ which are outputted from the current detecting unit 13. The phase detection unit 18 obtains the difference between the motor current differential vectors Pi1 and Pi2 detected by the current variation detection unit 17, calculates the vector phase θd from this difference, estimate a position of a magnetic pole with making the calculated vector phase θd coincide with the phase θc of the d-axis of the control system, and outputs the magnetic pole position estimate θ^. A frequency of the voltage pulse vdh is set as the highest possible value in consideration of vibration and noise. Moreover, a frequency of the voltage pulse vdh is set as the same value as the frequency of the PWM carrier of the inverter 3.

This embodiment has the carrier synchronization type magnetic pole position-estimating unit 9 that applies the voltage pulse vdh which has the same frequency as the PWM carrier of the inverter 3 in the direction of the d-axis (θc) of the control system (the direction of the magnetic pole position estimate θ^), fetches the current of the synchronous motor 1 synchronizing with the PWM carrier of the inverter 3, obtains the current differential difference generated by the application of the voltage pulse vdh, and estimates a magnetic pole position of the synchronous motor 1. Hence it is possible to perform magnetic pole position estimation that is a high response, low noise, and low torque pulsing. Moreover, the carrier synchronization type magnetic pole position-estimating unit 9 is based on the inductance characteristics of the synchronous motor 1. Hence it is possible to estimate a magnetic pole position of the synchronous motor 1 at high precision not only in a middle and high speed period but also in a low speed period including the startup period (startup period of a control apparatus 4) and stop period of the synchronous motor 1 in which the detection of an induced voltage is difficult.

In addition, in the inductance of a synchronous motor that has a saliency, a magnetic pole position changes every 180° of period. Hence a range of the magnetic pole position estimation that can be estimated on the basis of the inductance is limited to 180°. Hence the carrier synchronization type magnetic pole position-estimating unit 9 cannot discriminate whether the direction of a magnetic pole position estimate obtained in the startup period of the motor is a north pole direction (θ), or a south pole direction (θ+π). Then, in this embodiment, the carrier synchronization type magnetic pole position-estimating unit 9 is equipped with the polarity discriminating unit 19 that discriminates the polarity of a magnetic pole position estimate. The detail of the polarity discriminating unit 19 will be described later.

The carrier synchronization type magnetic pole position-estimating unit 9 is effective in the magnetic pole position estimation in the low speed period including the startup period (startup period of the control apparatus 4) and stop period of the synchronous motor 1. However, its operating range is not limited but can be theoretically applied to a high speed region. However, in order to estimate a magnetic pole position, it is always necessary to apply a voltage pulse for magnetic pole position estimation to a motor. For this reason, when not applying the voltage pulse for magnetic pole position estimation, it is possible that the noise and effectiveness are inferior. Then, in this embodiment, in a middle and high speed region where an induced voltage of the synchronous motor 1 is comparatively greatly generated, the equal potential type magnetic pole position-estimating unit 10 which estimates a magnetic pole position of the synchronous motor 1 on the basis of the induced voltage of the synchronous motor 1 is provided.

It is noteworthy that, in the equal potential type magnetic pole position-estimating unit 10, an induced voltage of the synchronous motor 1 is generated on the basis of the magnetic pole position of a rotor. In addition, as long as it estimates a magnetic pole position of the synchronous motor 1 on the basis of an induced voltage of the synchronous motor 1, any method of obtaining the induced voltage can be used. For example, there are a method of forming a resting period of switching of the inverter 3 and detecting a direct induced voltage in this period, a method of constituting an observer etc. by using a control voltage currently applied and current generated thereby, and estimating an induced voltage, or the like.

However, when high responsiveness is required of a control system, it is difficult to realize the high responsiveness in the two methods described above. For this reason, an effective method is a method of obtaining a phase of an induced voltage, i.e., a magnetic pole position by a current variation amount in an equal potential state (short-circuit state) of the synchronous motor 1 generated during PWM control. This method comes from paying attention to a fact that current behavior is determined only by an induced voltage of the synchronous motor 1 without being influenced by an applied voltage from the inverter 2 in a state of an equal potential of the synchronous motor.

Figure 5:
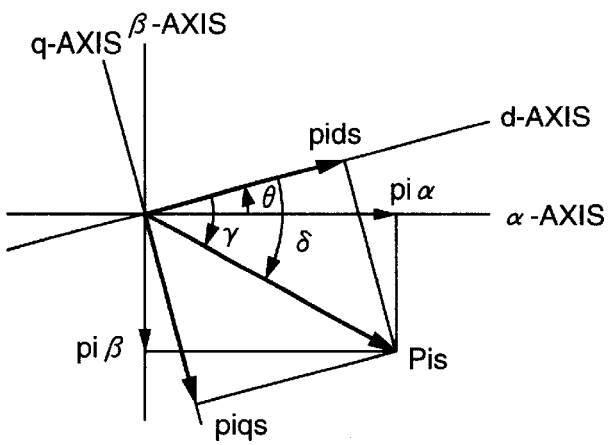
FIG. 5 is a vector diagram showing a principle of magnetic pole position estimation of an equal potential type position-estimating unit shown in FIG. 1.

FIG. 5 shows a principle of magnetic pole position estimation of the synchronous motor 1 by using an equal potential state of the synchronous motor 1. As shown in FIG. 5, a magnetic pole position θ is estimated by calculating the difference between a phase γ, formed by a three-phase equal potential current differential vector Pis and the α-axis of the static coordinate system, and phase δ formed by a three-phase equal potential current differential vector Pis and the d-axis of the rotation coordinate. Among these, the phase γ can be obtained by actually obtaining a current differential value in an equal potential state of the synchronous motor 1 and obtaining an angle formed with the α-axis. On the other hand, the phase θ can be obtained from a voltage equation of the synchronous motor 1 in three-phase equal potential state (short-circuit state V=0). The formula (1) shows a formula relating to the phase δ.

$$\delta = \tan^{-1}(piqs/pids) \quad (1)$$
$$= \tan^{-1}[-Ld\{\omega((Ld - Lq)id + \phi) +$$
$$R\ iq\}/\{Lq(\omega(Lq - Ld)iq - R\ id)\}]$$

Here, symbol R denotes a wirewound resistor, and symbols pids and piqs are components of the three-phase equal potential current differential vector Pis in the d-axis and q-axis. Symbol Ld denotes an inductance in the d-axis, symbol Lq denotes inductance in the q-axis, symbol ω does motor angular velocity, and symbol φ does magnetic flux that a magnet has.

In a formula (1), since it is possible to regard R≅0 in an operating range where speed is sufficiently large, it is possible to eliminate symbol ω.

Figure 6:
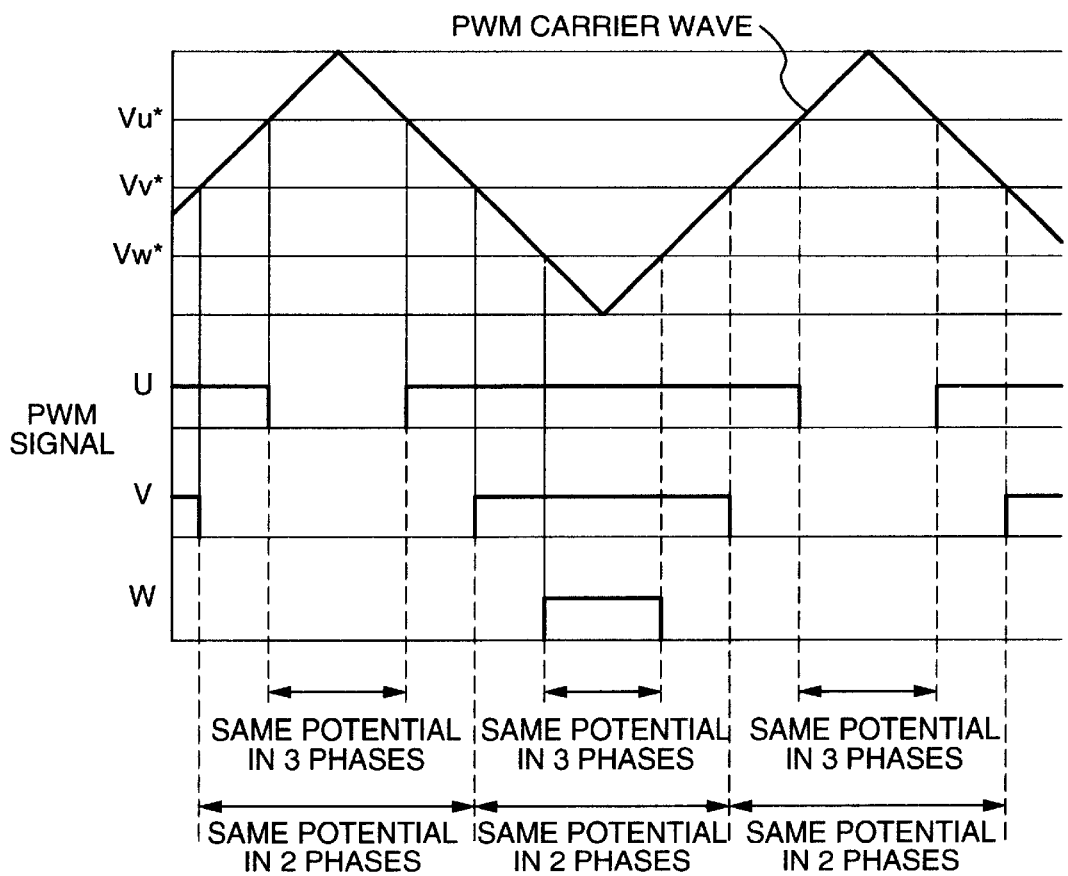
FIG. 6 is a diagram showing equal potential states that exist during PWM control.

FIG. 6 shows a three-phase equal potential state of the synchronous motor 1 used in this method. As apparent from FIG. 6, the three-phase equal potential state of the synchronous motor 1 exists during PWM control. If the three-phase equal potential state under PWM control is very short time and a current differential value cannot be calculated in the period, it is possible to use a two-phase potential period shown in FIG. 6. According to this method, since a magnetic pole position can be calculated every cycle of a PWM carrier, it is possible to correspond to a control system with high speed response.

According to this embodiment, since the equal potential type magnetic pole position estimation unit 10 that estimates the magnetic pole position of the synchronous motor 1 on the basis of an induced voltage of the synchronous motor 1 is provided in a middle and high speed region of the synchronous motor 1, it is unnecessary to apply a signal for magnetic position estimation like the carrier synchronization type magnet pole position-estimating unit 9. Hence, it is possible to estimate a magnetic pole position of the synchronous motor 1 without generating any noise and torque pulsation.

However, the equal potential type magnetic pole position-estimating unit 10 is a system of estimating a magnetic pole position of the synchronous motor 1 on the basis of an induced voltage. Hence it is difficult to estimate the magnetic pole position of the synchronous motor 1 in the low speed including a stop period. Then, in this embodiment, by combining the above-mentioned carrier synchronization type magnetic pole position-estimating unit 9 and the above-mentioned equal potential type magnetic pole position-estimating unit 10, the good sensorless characteristics are realized. Concretely, by starting the carrier synchronization type magnetic pole position-estimating unit 9 in the startup period of an apparatus or the stop period or low speed period of the synchronous motor 1, the magnetic pole position of the synchronous motor 1 is estimated. On the other hand, by starting the equal potential type magnetic pole position-estimating unit 10 at the middle and high speed period of the synchronous motor 1, a magnetic pole position of the synchronous motor 1 is estimated.

According to this embodiment, two magnetic pole position-estimating units are provided, and these two magnetic pole position-estimating units are properly used according to an operating state of an apparatus or the synchronous motor 1. Hence it is possible to smoothly control the drive of the synchronous motor 1 also in the startup period of an apparatus, or any speed of a synchronous motor 1. Moreover, when the synchronous motor 1 is rotating at middle and high speed, a voltage signal for magnetic pole position estimation is not applied, and hence it is possible to control the drive of the synchronous motor 1 in low noise and high efficiency.

Figure 7:
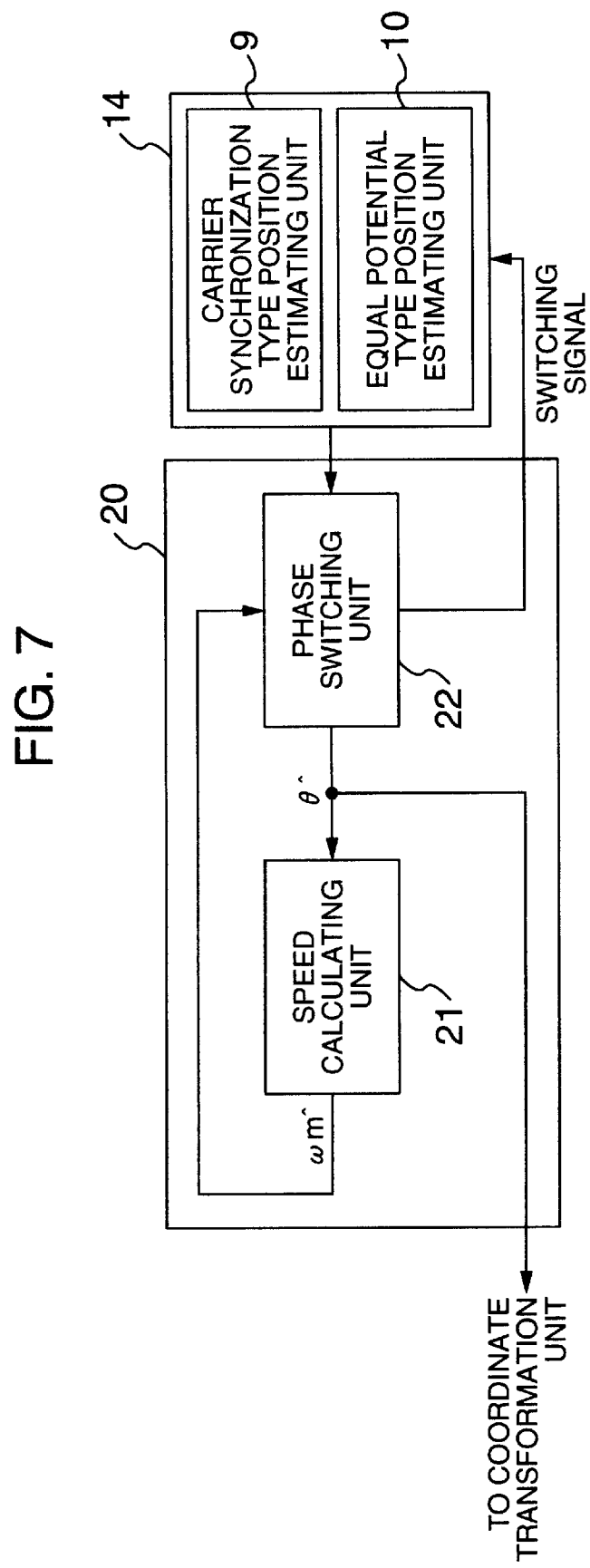
FIG. 7 is a block diagram showing a configuration of a magnetic pole position-switching unit shown in FIG. 1.

FIG. 7 shows the configuration of the magnetic pole position-switching unit 20 which switches the carrier synchronization type magnetic pole position-estimating unit 9 and the equal potential magnetic pole position-estimating unit 10. The magnetic pole position-switching unit 20 calculates the present speed of the synchronous motor 1, and switches the carrier synchronization type magnetic pole position-estimating unit 9 and the equal potential type magnetic pole position-estimating unit 10 according to this calculation result. In addition, the magnetic pole position-switching unit 20 has a phase-switching unit 22 and a speed-calculating unit 21.

The phase-switching unit 22 switches the carrier synchronization type magnetic pole position-estimating unit 9 and the equal potential type magnetic pole position-estimating unit 10 on the basis of the magnitude of the present speed of the synchronous motor 1. Furthermore, in the case of switching of the carrier synchronization type magnetic pole position-estimating unit 9 and the equal potential type magnetic pole position-estimating unit 10, the phase-switching unit 22 delivers the final value of the magnetic pole position-estimating unit before switching as an initial value of the magnetic pole position-estimating unit after switching. For this purpose, in the phase-switching unit 22, while the calculated speed value ωm^ outputted from the speed operation part 21 is inputted, an magnetic pole position estimate θ^ (phase θc of the d-axis in the control system) outputted from either the carrier synchronization type magnetic pole position-estimating unit 9 or the equal potential type magnetic pole position-estimating unit 10 is inputted. The phase-switching unit 22 determines one of the two magnetic pole position estimation units on the basis of a calculated speed value ωm-inputted, and outputs a switching signal to the magnetic pole position-estimating unit 14. Moreover, the phase-switching unit 22 outputs the magnetic pole position estimate θ^ of either the carrier synchronization type magnetic pole position-estimating unit 9 or the equal potential type magnetic pole position-estimating unit 10 (phase θc of the d-axis in the control system), which is inputted.

The speed operation part 21 calculates the present speed of the synchronous motor 1 on the basis of an magnetic pole position estimate θ^ (phase θc of the d-axis in the control system) estimated by the magnetic pole position-estimating unit 14. For this purpose, the magnetic pole position estimate θ^ of either the carrier synchronization type magnetic pole position-estimating unit 9 or the equal potential type magnetic pole position-estimating unit 10 (phase θc of the d-axis in the control system), which is outputted from the phase-switching unit 22, is inputted into the speed-calculating unit 21. The speed-calculating unit 21 calculates the present speed of the synchronous motor 1 on the basis of the magnetic pole position estimate θ^ of either the inputted carrier synchronization type magnetic pole position-estimating unit 9 or the equal potential type magnetic pole position-estimating unit 10 (phase θc of the d-axis in the control system) to output the calculated speed value ωm^ to the phase-switching unit 22. Moreover, the magnetic pole position estimate θ^ of either the carrier synchronization type magnetic pole position-estimating unit 9 or the equal potential type magnetic pole position-estimating unit 10 (phase θc of the d-axis in the control system), which is outputted from the phase-switching unit 22, is inputted into the three-phase transducer 11 and the d-q transducer 8.

By the way, when the carrier synchronization type magnetic pole position-estimating unit 9 and the equal potential type magnetic pole position-estimating unit 10 are switched on the basis of the switching signal outputted from the phase-switching unit 22, a phase jump of an magnetic pole position estimate may occur due to a transient state, calculation delay, etc. of the magnetic pole position-estimating unit after switching. If the phase jump of a magnetic pole position estimate occurs, the voltage applied to a synchronous motor 1 suddenly changes, and hence the torque of the synchronous motor 1 is changed. Hence it becomes impossible to make the drive of the synchronous motor 1 continued in a good state. Then, in this embodiment, the magnetic pole position estimate is compensated by the phase-switching unit 22 according to the present speed of the synchronous motor 1 in predetermined time until an estimate of the magnetic pole position-estimating unit after switching is established.

Hereafter, this embodiment will be described on the basis of FIG. 8. FIG. 8 shows an output of the magnetic pole position estimate θ^ from the phase-switching unit 22. As shown by θ1 (dotted line) in FIG. 8, in the magnetic pole position-estimating unit before switching, the magnetic pole position estimate becomes inaccurate at the time of switching start. On the other hand, in the magnetic pole position-estimating unit after switching, as shown by θ3 (dotted line) in FIG. 8, a transient state arises after switching start, and a phase jump arises and gradually converges thereafter. For this reason, in this embodiment, as shown by θ2 (continuous line) in FIG. 8, phase compensation of the magnetic pole position estimate is performed for the time equivalent to three sampling periods according to the speed of the synchronous motor 1 in a predetermined period until the switching transient state settles in a steady state. At this time, a phase amount Δθ^ compensated in one sampling is expressed by the following formula (2).

$$\Delta\theta^{\hat{}} = \omega m^{\hat{}} \times Ts \qquad (2)$$

Here, a term ωm^ denotes a motor speed estimate and a term Ts is sampling time.

When the transient state of the pole position-estimating unit after switching settles down and the magnetic pole position estimate by the magnetic pole position-estimating unit after switching is established, the phase compensation by the phase-switching unit 22 is switched to the magnetic pole position estimate by the pole position estimation unit after switching.

According to this embodiment, when the magnetic pole position-estimating unit is switched, the phase compensation of the magnetic pole position estimate is performed according to the speed of the synchronous motor 1. Hence a phase jump of the magnetic pole position estimate that may happen at the time of switching of the magnetic pole position-estimating unit can be prevented. Therefore, switching between the magnetic pole position-estimating units can be smoothly performed. Thereby, a torque change of the synchronous motor 1 can be prevented. Therefore, the drive of the synchronous motor 1 can be continued satisfactorily.

In addition, in this embodiment, the switching of the magnetic pole position-estimating units at the time of acceleration of the synchronous motor 1 is described by using FIG. 8. However, also in the switching of the magnetic pole position-estimating units at the time of deceleration of the synchronous motor 1, the sign of the estimated speed of the synchronous motor 1 only becomes negative. Hence phase compensation can be performed similarly to that in FIG. 8. FIG. 9 shows the phase compensation by the phase-switching unit 22 at the time of deceleration of the synchronous motor 1. Also in the case of FIG. 9, as shown by θ2 (continuous line) in FIG. 9, phase compensation of the magnetic pole position estimate is performed for the time equivalent to three sampling periods according to the speed of the synchronous motor 1 in a predetermined period until the transient state of the magnetic pole position-estimating unit after switching settles in a steady state.

Next, a starting method of the control apparatus 4 according to this embodiment will be described. As described above, the control apparatus 4 according to this embodiment starts the carrier synchronization type magnetic pole position-estimating unit 9 in a low speed period including a startup period (startup period of the control apparatus 4) and a stop period of the synchronous motor 1, and starts the equal potential type magnetic pole position-estimating unit 10 in a middle and high speed period of the synchronous motor 1. The carrier synchronization type magnetic pole position-estimating unit 9 is a system that can estimate a magnetic pole position of the synchronous motor 1 from a stop period to a high speed period over a wide range. However, since the carrier synchronization type magnetic pole position-estimating unit 9 is theoretically based on the inductance characteristics of the synchronous motor 1, it is impossible to discriminate whether the magnetic pole position estimated in the startup period of the apparatus corresponds in the direction of a north pole (θ direction), or the direction of a south pole (direction of θ+π).

Then, in this embodiment, the carrier synchronization type magnetic pole position-estimating unit 9 is equipped with the polarity discriminating unit 19, which judges the polarity of the magnetic pole position in a startup period. A method of using the magnetic saturation characteristics of the synchronous motor 1 is adopted as polarity discrimination in the polarity discriminating unit 19. Thus, the polarity discriminating unit 19 of this embodiment discriminates the polarity on the basis of the difference between a value of the inductance generated when a forward current is flown in the direction of the d-axis of the synchronous motor 1, and a value of the inductance generated when a negative current is flown.

Since magnetic flux is established with the permanent magnet embedded at the rotor in the permanent magnet synchronous motor, an inductance value in the positive direction becomes small by magnetic saturation if the same magnitude of current is flown in the positive and negative directions of the d-axis. In this embodiment, such characteristics are utilized. The carrier synchronization type magnetic pole position-estimating unit 9 applies the voltage pulse vdh for position estimation in the direction of a magnetic pole position estimate. For this reason, the polarity discriminating unit 19 obtains the inductance in the d-axis by making the current for a polar judgment flow in the direction of the d-axis, and thereafter calculating a current differential value in the d-axis that is generated by the voltage pulse Vdh.

Here, the concrete operation of the startup period of the carrier synchronization type magnetic pole position-estimating unit 9 will be described with using the flow chart in FIG. 10. In the startup period of a motor, the carrier synchronization type magnetic pole position-estimating unit 9 first, applies the voltage pulse vdh for position estimation, which synchronizes with the PWM carrier, in the direction of the d-axis in the control system (step S1). Next, the vector phase θd of a current differential difference of the voltage pulse vdh for position estimation between the positive and negative potential sides is obtained (step S2). The magnetic pole position estimate of the synchronous motor 1 is calculated by making the vector phase θd of the current differential difference coincide with the phase θc of the d-axis in the control system (step S3). At this time, since the polarity of the magnetic pole position estimate is unknown, a predetermined forward current is flown in the direction of the magnetic pole position estimate that is obtained at step S3. Then, the current differential value in the direction of the d-axis in the control system, which is generated by the voltage pulse vdh is calculated (step S4). Next, a threshold set beforehand is compared with the current differential value calculated at step S4 (step S5).

Next, the polarity of the direction of a magnetic pole position estimate is discriminated on the basis of the comparison result obtained at step S5 (steps S6 and S7). The inductance Ld is small when the current differential value in the direction of the d-axis in the control system is larger than a threshold. Hence it is judged that the pole is a north pole at step S6, and a phase θc of the d-axis in the control system is made to be an magnetic pole position estimate θ^ (θ^=θc). Since the inductance Ld is large if the current differential value in the direction of the d-axis in the control system is smaller than the threshold, it is judged at step S7 that the pole is a south pole. Then, the phase θc of the d-axis in the control system is compensated by 180° to be made to be a magnetic pole position estimate θ^ (θ^=θc+180°). The carrier synchronization type magnetic pole position-estimating unit 9 according to this embodiment, as described above, operates in the startup period of the synchronous motor 1.

In addition, polarity discrimination in the polarity discriminating unit 19 is not limited to the method described above. For example, a method that can be used is a method in that currents are flown in the positive and negative directions of the d-axis in the control system, a current differential value by a voltage pulse when flowing a current in the positive direction is compared with a current differential value by a voltage pulse at the time of flowing a current in the negative direction, and the polarity is discriminated on the basis of this comparison result. Furthermore, here, the magnitude of a current flown in the direction of a magnetic pole position estimate is made to be the magnitude that makes magnetic saturation generated. However, if difference arises in inductances Ld detected by the application of voltage pulses when smaller currents are flown in the positive and negative directions with a current smaller than it, a current to that extent can be flown.

Moreover, since an induced voltage occurs while the synchronous motor 1 is rotating in the startup period, polarity can be discriminated by current variation in an equal potential state, that is, a short-circuit state of the synchronous motor 1. As described above, since the equal potential state of the synchronous motor 1 exists during the usual PWM control, it does not need to generate the equal potential state anew. At this time, the polarity discrimination using magnetic saturation characteristics is performed by regarding that a period when current variation in the equal potential state is smaller than a predetermined value is a low speed period.

Moreover, after the carrier synchronization type magnetic pole position-estimating unit 9 determines an magnetic pole position estimate θ^ in the startup period, it is not necessary to perform polarity discrimination in principle. Thus, after the starting of the synchronous motor 1, it is possible to continue magnetic pole position estimation only by the position calculating unit 15 except the polarity discriminating unit 19. In addition, it is effective in respect of polarity reverse prevention to start the polarity discriminating unit 19 in the stop period of the synchronous motor 1 every predetermined period to check the present polarity of the magnetic pole position estimate θ^. A polarity correction is performed when difference arises between the polarity obtained by the polarity discriminating unit 19 in this check and the present polarity of the magnetic pole position estimate θ^. Thereby, when the polarity of a magnetic pole position estimate θ^ is reversed in the stop period of the synchronous motor 1 by a certain cause, the polarity can be corrected promptly.

According to the embodiment described above, the control apparatus 4 has two magnetic pole position-estimating units, that is, the carrier synchronization type magnetic pole position-estimating unit 9 and the equal potential type magnetic pole position-estimating unit 10. In the low speed period including the startup period (startup period of the control apparatus 4) and stop period of the synchronous motor 1, the control apparatus 4 switches the magnetic pole position-estimating unit to the carrier synchronization type magnetic pole position-estimating unit 9 to estimate a magnetic pole position of the synchronous motor 1. In addition, in the middle and high speed period of the synchronous motor 1, the control apparatus 4 switches the magnetic pole position-estimating unit to the equal potential type magnetic pole position-estimating unit 10 to estimate a magnetic pole position of the synchronous motor 1. Hence it is possible to estimate the magnetic pole position of the synchronous motor 1 by the magnetic pole position-estimating unit optimum in each state. Therefore, it is possible to estimate the magnetic pole position of the synchronous motor 1 in all the operating states of the synchronous motor 1 in high responsiveness, high precision and high efficiency.

[Embodiment 2]

Figure 11:
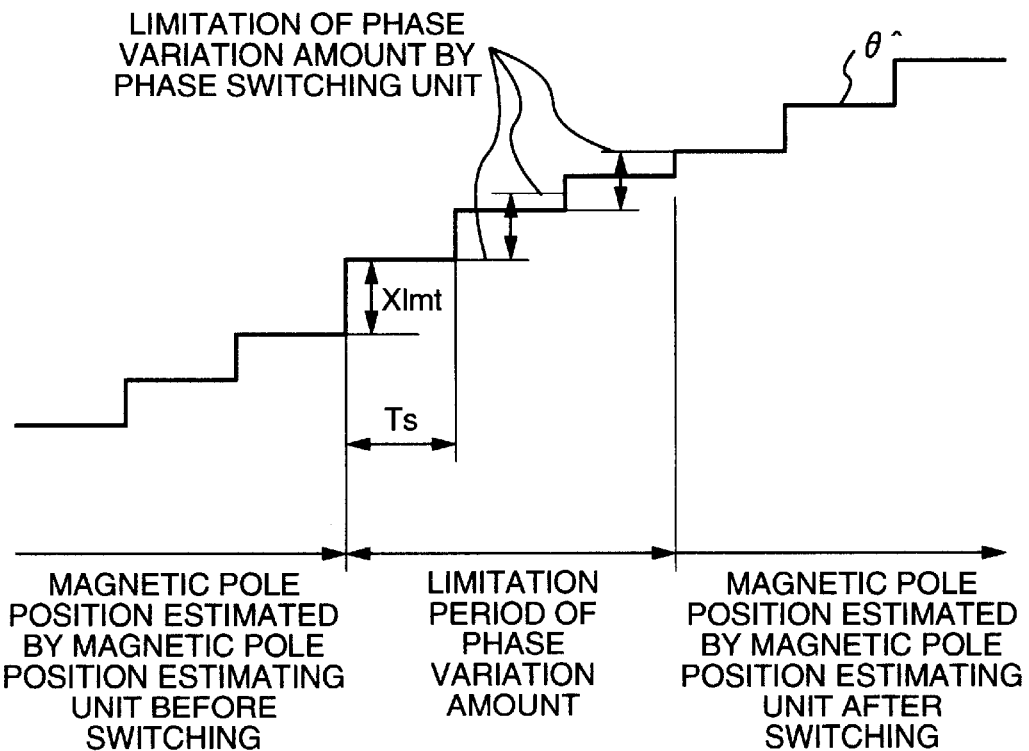
FIG. 11 is a chart showing an output of an magnetic pole position estimate OA of the phase-switching unit in a control apparatus for a motor which is a second embodiment of the present invention.

A second embodiment of the present invention will be described on the basis of FIG. 11. FIG. 11 shows the operating characteristic of the magnetic pole position-switching unit 20 according to the second embodiment. This embodiment is an example of improvement of the first embodiment, and the configuration of the control apparatus 4 is fundamentally the same as the precedent. Hereafter, parts different from the precedent will be described.

In this embodiment, at the time of switching in a phase-switching unit 22, the magnetic pole position-switching unit 20 operates so that the variation of an magnetic pole position estimate may be restricted according to the present speed of the synchronous motor 1 in a predetermined period until the estimate of the magnetic pole position-estimating unit after switching is established. Thus, as shown in FIG. 11, the amount of phase changes is restricted on the basis of a limiting value Xlmt shown in formula (3) in three-sampling periods from immediately after switching to the magnetic pole position-estimating unit after switching from the magnetic pole position-estimating unit before switching.

$$Xlmt = \omega m\hat{} \times Ts \times Klmt \qquad (3)$$

Here, a term Klmt denotes an arbitrary coefficient, a term $\omega m\hat{}$ does a motor speed estimate, and a term Ts does sampling time.

Since, according to this embodiment, the amount of phase changes is restricted in a predetermined period until an estimate of the magnetic pole position-estimating unit after switching is established, it is possible to prevent the change of the magnetic pole position estimate that is generated at the time of switching of the magnetic pole position-estimating unit. Furthermore, it is possible to smoothly switch the two magnetic pole position-estimating units alternately.

[Embodiment 3]

Figure 12:
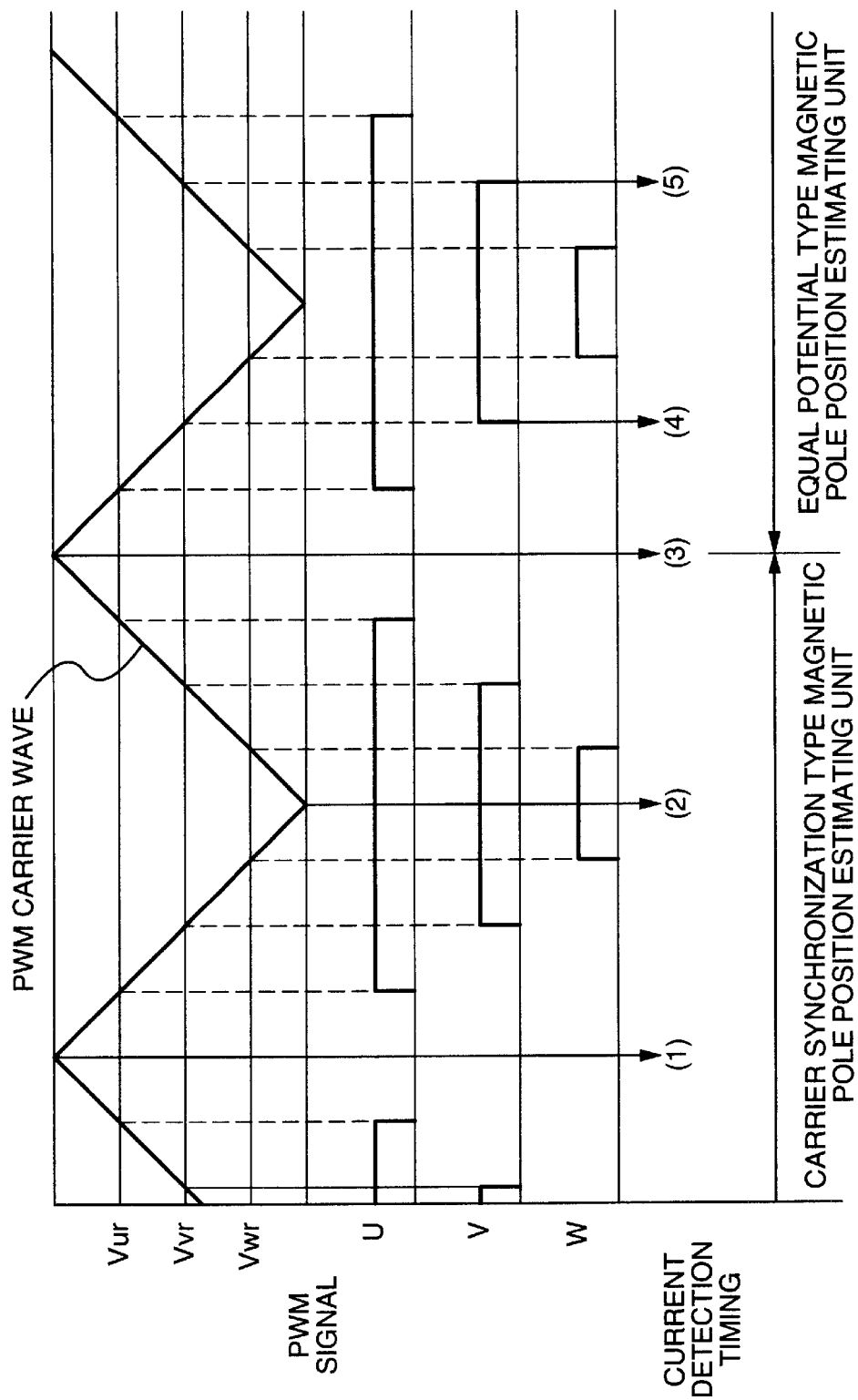
FIG. 12 is a chart showing the current detection timing switching of a control apparatus for a motor that is a third embodiment of the present invention.

A third embodiment of a present invention is described on the basis of FIG. 12. FIG. 12 shows the switching characteristics of the current detection timing of the third embodiment. This embodiment is an example of improvement of the first embodiment, and the configuration of the control apparatus 4 is fundamentally the same as the precedent. Hereafter, parts different from the precedent will be described.

In this embodiment, when two magnetic pole position-estimating units are switched, the current detection timing of the synchronous motor 1 is switched. Since using a current differential value generated with a voltage pulse synchronizing with a PWM carrier, the carrier synchronization type magnetic pole position-estimating unit 9 detects the current of the synchronous motor 1 by synchronizing with a PWM carrier. On the other hand, since using the current variation amount of equal potential states of the synchronous motor 1, the equal potential type magnetic pole position-estimating unit 10 detects the motor current with synchronizing with a PWM signal. For this reason, when two magnetic pole position-estimating units are switched, it is necessary to also switch the current detection timing of the synchronous motor 1.

Then, as shown in FIG. 12, current detection timing is switched. In addition, symbols Vur, Vvr, and Vwr shown in FIG. 12 denote three-phase AC voltage commands. In this case, within current detection timing (1) to (3) in FIG. 12, the control apparatus 4 starts the carrier synchronization type magnetic pole position-estimating unit 9, and thereafter starts the equal potential type magnetic pole position-estimating unit 10. The current detection timing (1) to (3) becomes the timing that synchronizes with the PWM carrier, and the current detection timing (4) and (5) become the timing that synchronizes with the PWM signal. The change of the startup timing of an A/D converter can achieve the switching of current detection timing with an arithmetic unit (for example, microcomputer) that constitutes the control apparatus 4.

According to this embodiment, the current detection timing can be changed according to a kind of a magnetic pole position-estimating unit. Hence a magnetic pole position-estimating unit is not limited to a magnetic pole position-estimating unit having the same current detection timing. Therefore, it is possible to correspond to any combination of magnetic pole position-estimating units and to obtain a control apparatus with general versatility.

[Embodiment 4]

Figure 13:
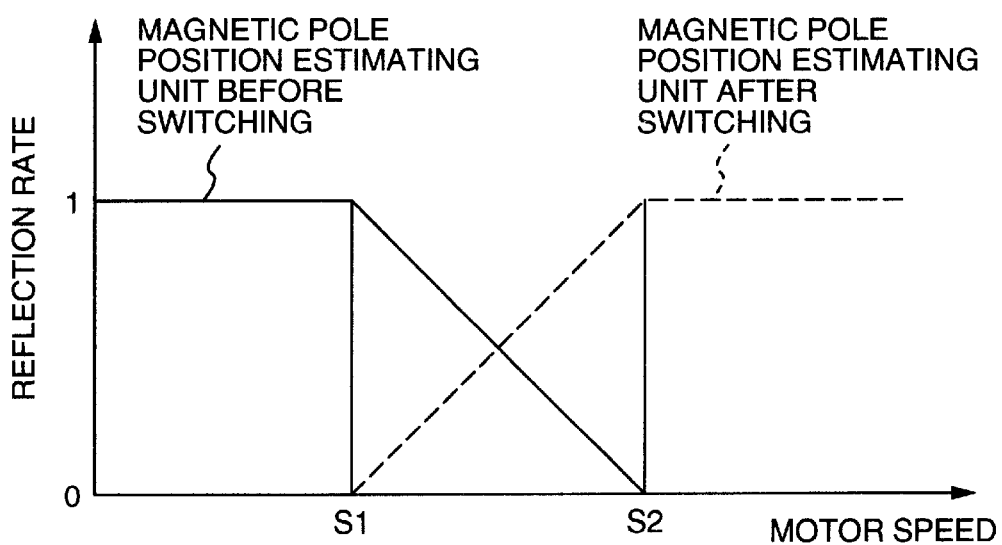
FIG. 13 is a graph showing a switching at the time of simultaneously starting two kinds of magnetic pole position-estimating units in a control apparatus for a motor which is a fourth embodiment of the present invention.

A fourth embodiment of the present invention will be described on the basis of FIG. 13. FIG. 13 shows the operating characteristic of the magnetic pole position-switching unit 20 according to the fourth embodiment. This embodiment is an example of improvement of the first embodiment, and the configuration of the control apparatus 4 is fundamentally the same as the precedent. Hereafter, parts different from the precedent will be described.

In this embodiment, two magnetic pole position-estimating units are started simultaneously, and are switched. If the processing load of the control apparatus 4 is taken into consideration, it is difficult to start two magnetic pole position-estimating units simultaneously. However, it is possible if there are two or more arithmetic units that constitute the control apparatus 4 and the control apparatus 4 is highly efficient. Then, in this embodiment, the control apparatus 4 changes a rate reflected in a magnetic pole position estimate between two magnetic pole position-estimating units in a predetermined speed area (from S1 to S2) according to the speed of the synchronous motor 1. Thus, after passing through the speed of S1, the rate of the magnetic pole position-estimating unit reflecting the magnetic pole position estimate before switching is gradually reduced, and the rate of the magnetic pole position-estimating unit reflecting the magnetic pole position estimate after switching is gradually increased. In the speed of S2, the rate of a magnetic pole position-estimating unit reflecting the magnetic pole position estimate before switching is made to be 0, and the rate of the magnetic pole position-estimating unit reflecting the magnetic pole position estimate after switching is made to be 1.

According to this embodiment, in a predetermined speed region, two magnetic pole position-estimating units are switched with changing the rate of reflection to a magnetic pole position estimate between two magnetic pole position-estimating units according to the speed of the synchronous motor 1. Hence, it is possible without performing any phase compensation to suppress the torque change of the synchronous motor 1 at the time of switching of the magnetic pole position-estimating units, and to smoothly switch the magnetic pole position-estimating units. In addition, this effectiveness can be further increased, if both two magnetic pole position-estimating units have sufficient estimating precision in a speed range when magnetic pole position-estimating units are switched.

Moreover, according to this embodiment, since two magnetic pole position-estimating units are started simultaneously, two magnetic pole position estimates simultaneously obtained from two magnetic pole position-estimating units can be compared. Thereby, error detection or step-out detection of the control apparatus 4 and current detectors 5*u* and 5*v* can be performed.

[Embodiment 5]

Figure 14:
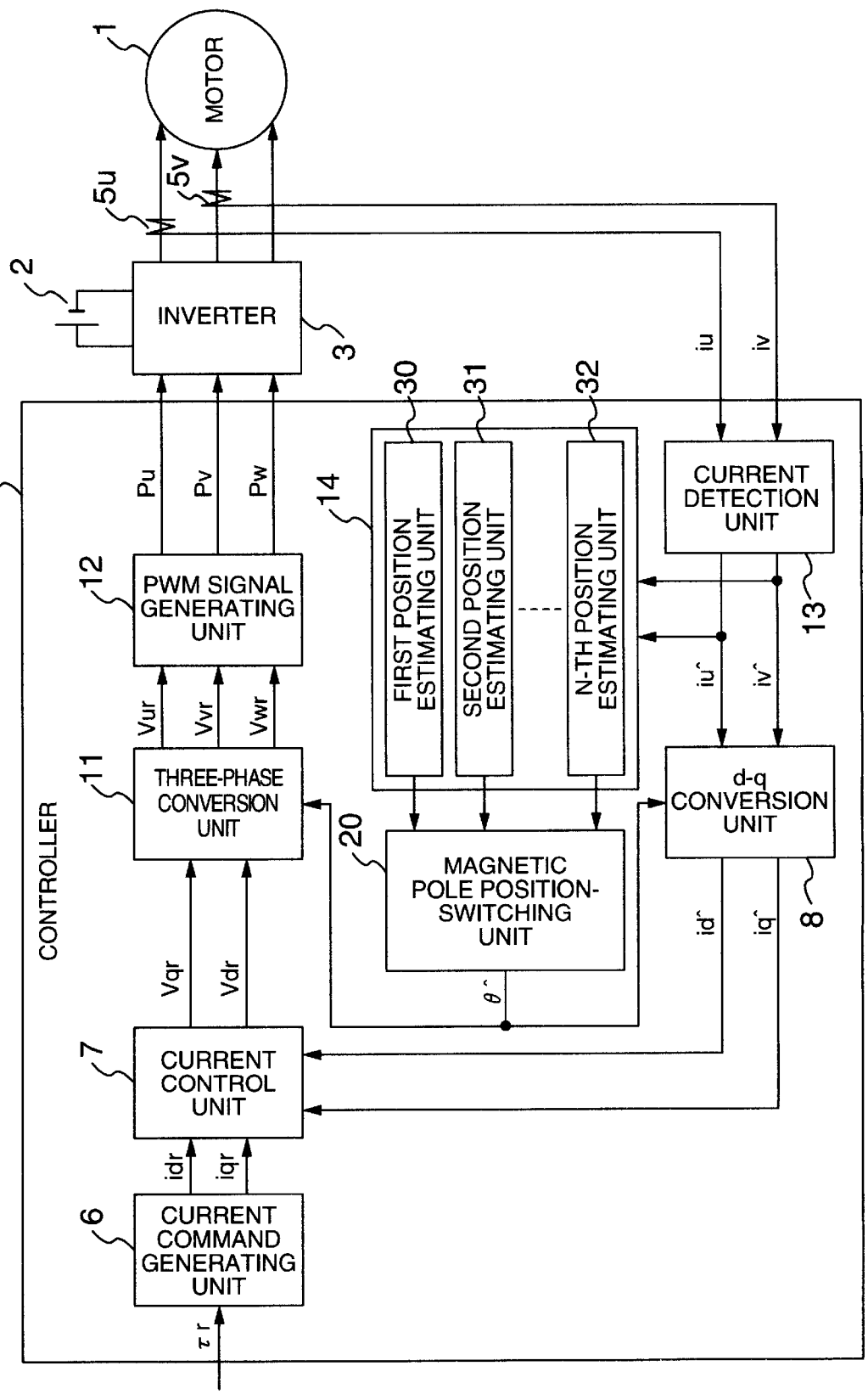
FIG. 14 is a block diagram showing a configuration of a control apparatus for a motor that is a fifth embodiment of the present invention.

A fifth embodiment of the present invention will be described on the basis of FIG. 14. FIG. 14 shows the configuration of a motor control apparatus of the fifth embodiment. This embodiment is a modified example of the first embodiment. In this embodiment, the control apparatus 4 has a magnetic pole position-estimating unit 14 equipped with three or more magnetic pole position-estimating units such as a first magnetic pole position-estimating unit 30, a second magnetic pole position-estimating unit 31, . . . , and an nth magnetic pole position-estimating unit 32. Moreover, any method of the first to fourth embodiments described above is used for a magnetic pole position-switching unit 20. Since other parts are the same as those of the first embodiment, their description will be omitted.

It is an effective method of performing the good sensorless drive of the synchronous motor 1 to use a magnetic pole position-estimating unit with a high magnetic pole position-estimating precision in a low speed period including a startup period (startup period of the control apparatus 4) and a stop period of the synchronous motor 1. For this reason, in this embodiment, the control unit 4 has a magnetic pole position-estimating unit, for example, the carrier synchronization type magnetic pole position-estimating unit described above as one of a plurality of magnetic pole position-estimating units.

If a magnetic pole position-estimating unit with a low magnetic pole position-estimating precision in a low speed period including a startup period (startup period of control apparatus 4) and a stop period of the synchronous motor 1, for example, a method of estimating a magnetic pole position on the basis of an induced voltage is used, there is a possibility of failing to start the synchronous motor 1 (because an induced voltage required for a magnetic pole estimation is not obtained in a synchronous motor 1). However, in this embodiment, since having a carrier synchronization type magnetic pole position-estimating unit with a high magnetic pole position-estimating precision, the control apparatus 4 can certainly start the synchronous motor 1.

On the other hand, it is effective for performing the good sensorless drive of the synchronous motor 1 to use an magnetic pole position-estimating unit with high efficiency in a speed region where there is not so large difference between magnetic pole position estimation precisions of the plurality of magnetic pole position-estimating units. Here, the speed region where there is not so large difference between magnetic pole position estimation precisions of the plurality of magnetic pole position-estimating units means a middle and high speed region of the synchronous motor 1. For this reason, in this embodiment, the control apparatus 4 has a magnetic pole position-estimating unit with high efficiency, for example, the equal potential type magnetic pole position-estimating unit, which estimates a magnetic pole position on the basis of an induced voltage and is described in the precedent, as another one of the plurality of magnetic pole position-estimating units.

In a middle and high speed range of the synchronous motor 1, even if the above-mentioned carrier synchronization type magnetic pole position-estimating unit is used, a magnetic pole position can be estimated with high precision. However, it is always necessary to apply a voltage pulse during magnetic pole position estimation in a carrier synchronization type magnetic pole position-estimating unit. Hence the equal potential type magnetic pole position promotion unit that estimates a magnetic pole position on the basis of an induced voltage is effective if effectiveness is taken into consideration. Then, in this embodiment, the control apparatus 4 has the equal potential type magnetic pole position promotion unit with high efficiency. Therefore, according to this embodiment, it is possible to estimate a magnetic pole position of the synchronous motor 1 in high efficiency.

Moreover, in this embodiment, as another one of the plurality of magnetic pole position-estimating units, the control apparatus 4 has means for estimating a magnetic pole position of the synchronous motor 1 with using the magnetic pole position-estimating unit whose system is different from a carrier synchronization type magnetic pole position-estimating unit and an equal potential type magnetic pole position-estimating unit, for example, means which uses a voltage equation of the synchronous motor 1. Alternatively, the control apparatus 4 has two or more carrier synchronization type magnetic pole position-estimating units or equal potential type magnetic pole position-estimating units.

According to this embodiment, a control apparatus has a plurality of magnetic pole position estimation units whose magnetic pole position-estimating units are different from each other, and estimates a magnetic pole position of a synchronous motor 1 by switching magnetic pole position estimation units corresponding to each of a plurality of operating states of the synchronous motor 1. It is possible to always estimate a magnetic pole position of the synchronous motor 1 with an optimum magnetic pole position-estimating unit. Therefore, it is possible to estimate the magnetic pole position of the synchronous motor 1 in all the operating states of the synchronous motor 1 in high speed response, high precision and high efficiency.

The control apparatuses according to the first to fifth embodiments described above are applicable to all AC motors regardless of applications. In particular, suitable applications are permanent magnet synchronous motors mounted in electric vehicles such as an electric car and a hybrid car. Thus, a position-sensorless control system is effective in cost reduction, and the mounting, adjustment, and maintenance of a position sensor is unnecessary. On the other hand, in electric vehicles such as an electric car and a hybrid car, a drive system is required to be highly efficient, small and light, and low in cost. Hence, it is suitable for satisfying the demand of the drive system of electric vehicles such as an electric car and a hybrid car to apply the control apparatuses according to the first to fifth embodiments to electric vehicles such as an electric car and a hybrid car.

In the control apparatuses according to the first to fifth embodiments, a magnetic pole position-estimating unit that generates comparatively large noise is used in a low speed period including a startup period and a stop period of a synchronous motor, and a magnetic pole position-estimating unit which does not generate noise is used in a middle and high speed period. Also in an electric vehicle which hardly has sound generated in a stop period and a low speed period of the vehicle, such as an electric vehicle or a hybrid car, it is possible to make pedestrians, etc. know the presence of a vehicle itself at a low speed period, including the startup period and the stop period of the vehicle, and to secure the safety to the pedestrians, etc. Moreover, this vehicle never gives unpleasure, caused by noise, to a driver in a middle and high speed period.

In addition, in the first to fifth embodiments, the torque control system where a torque command is inputted into a control apparatus is shown. However, it is allowed to constitute a velocity control system or a position control system as a higher level system of the torque control system. Here, when a velocity control system is constituted on the high order of a torque control system, it is possible to use a motor speed estimate $\omega m^\wedge$ calculated from the time variation amount of a magnetic pole position estimate in the speed-calculating unit 21 as a feedback value of speed.

According to the present invention, it is possible to estimate a magnetic pole position of a motor with an always-optimum magnetic pole position-estimating method. Therefore, it is possible to estimate a rotor magnetic pole position of the motor in all the operating regions of the motor in high speed response, high precision and high efficiency.

What is claimed is:

1. A control apparatus for a motor that controls a voltage applied to an AC motor from a power converter by a PWM signal, wherein the control apparatus for the motor estimates a rotor magnetic pole position of the AC motor with at least two different magnetic pole position-estimating methods, estimates the rotor magnetic pole position of the AC motor with selectively switching the at least two magnetic pole position-estimating methods according to an operating state of the AC motor throughout an operating range of the AC motor, wherein, when the at least two magnetic pole position-estimating methods are switched, a rotor magnetic pole position of the AC motor is calculated on the basis of an operating state of the AC motor in a predetermined period.

2. A control apparatus for a motor that controls a voltage applied to an AC motor from a power converter by a PWM signal, wherein the control apparatus for the motor estimates a rotor magnetic pole position of the AC motor with a magnetic pole position-estimating method based on a detected current value of the AC motor detected with at least synchronizing with a carrier of the PWM signal, and a magnetic vole position-estimating method based on a detected current value of the AC motor detected in an equal potential state of the AC motor, and estimates a rotor magnetic pole position of the AC motor by switching the at least two magnetic pole position-estimating methods according to an operating state of the AC motor throughout an operating range of the AC motor wherein, when the at least two magnetic pole position-estimating methods are switched, a rotor magnetic pole position of the AC motor is calculated on the basis of an operating state of the AC motor in a predetermined period.

3. A control apparatus for a motor that controls a voltage applied to an AC motor from a power converter by a PWM signal, wherein the control apparatus for the motor estimates a rotor magnetic pole position of the AC motor with at least two different magnetic pole position-estimating methods, estimates the rotor magnetic role position of the AC motor with selectively switching the at least two magnetic pole position-estimating methods according to an operating state of the AC motor throughout an operating range of the AC motor wherein, when the at least two magnetic pole position-estimating methods are switched, a variation amount of the rotor magnetic pole position of the AC motor estimated by a magnetic pole position-estimating method after switching on the basis of an operating state of the AC motor in a predetermined period.

4. A control apparatus for a motor that controls a voltage applied to an AC motor from a power converter by a PWM signal, wherein the control apparatus for the motor estimates a rotor magnetic pole position of the AC motor with at least two different magnetic pole position-estimating methods, estimates the rotor magnetic pole position of the AC motor with selectively switching the at least two magnetic pole position-estimating methods according to an operating state of the AC motor throughout an operating range of the AC motor wherein, when the at least two magnetic pole position-estimating methods are switched, a variation amount of the rotor magnetic pole position of the AC motor estimated by a magnetic pole position-estimating method after switching on the basis of an operating state of the AC motor in a predetermined period.

5. A control apparatus for a motor that controls a voltage applied to an AC motor from a power converter by a PWM signal, wherein the control apparatus for the motor estimates a rotor magnetic pole position of the AC motor with a magnetic role position-estimating method based on a detected current value of the AC motor detected with at least synchronizing with a carrier of the PWM signal, and a magnetic pole position-estimating method based on a detected current value of the AC motor detected in an equal potential state of the AC motor, and estimates a rotor magnetic pole position of the AC motor by switching the at least two magnetic pole position-estimating methods according to an operating state of the AC motor throughout an operating range of the AC motor wherein, when the at least two magnetic pole position-estimating methods are switched, current detection timing of the AC motor is changed.

6. A control apparatus for a motor that controls a voltage applied to an AC motor from a power converter by a PWM signal, wherein the control apparatus for the motor estimates a rotor magnetic pole position of the AC motor with at least two different magnetic pole position-estimating methods, estimates the rotor magnetic pole position of the AC motor with selectively switching the at least two magnetic pole position-estimating methods according to an operating state of the AC motor throughout an operating range of the AC motor wherein, when the at least two magnetic pole position-estimating methods are switched, current detection timing of the AC motor is changed.

7. A control apparatus for a motor that controls a voltage applied to an AC motor from a power converter by a PWM signal, comprising:

carrier synchronization type position-estimating means for estimating a rotor magnetic pole position of the AC motor on the basis of a detected current value of the AC motor detected by synchronizing with a carrier of the PWM signal;

equal potential type position-estimating means for estimating a rotor magnetic pole position of the AC motor on the basis of a detected current value of the AC motor detected in an equal potential state of the AC motor; and means for switching magnetic pole position-estimating means from between the carrier synchronization type position-estimating means and equal potential type position-estimating means throughout an operating range of the AC motor according to an operating state of the AC motor, wherein the switching means calculates a rotor magnetic pole position of the AC motor on the basis of an operating state of the AC motor in a predetermined period.

8. A control apparatus for a motor that controls a voltage applied to an AC motor from a power converter by a PWM signal, comprising:

carrier synchronization type position-estimating means for estimating a rotor magnetic pole position of the AC motor on the basis of a detected current value of the AC motor detected by synchronizing with a carrier of the PWM signal;

equal potential type position-estimating means for estimating a rotor magnetic role position of the AC motor on the basis of a detected current value of the AC motor detected in an equal potential state of the AC motor; and means for switching magnetic pole position-estimating means from between the carrier synchronization type position-estimating means and equal potential type position-estimating means throughout an operating range of the AC motor according to an operating state of the AC motor, wherein the switching means restricts a variation amount of a rotor magnetic pole position of the AC motor, which is estimated by magnetic pole position-estimating means after switching, on the basis of an operating state of the AC motor in a predetermined period.

9. A control apparatus for a motor that controls a voltage applied to an AC motor from a power converter by a PWM signal, comprising:

carrier synchronization type position-estimating means for estimating a rotor magnetic role position of the AC motor on the basis of a detected current value of the AC motor detected by synchronizing with a carrier of the PWM signal;

equal potential type position-estimating means for estimating a rotor magnetic pole position of the AC motor on the basis of a detected current value of the AC motor detected in an equal potential state of the AC motor; and means for switching magnetic pole position-estimating means from between the carrier synchronization type position-estimating means and equal potential type position-estimating means throughout an operating range of the AC motor according to an operating state of the AC motor, wherein the switching means changes current detection timing of the AC motor at the time of switching the magnetic pole position-estimating means.

10. An electric vehicle, comprising:
an AC motor which drives wheels;
an on board power source;
a power converter which converts into alternating current power direct current power supplied from said on board power supply and supplies the alternating current power to the AC motor; and
a control apparatus which controls the power converter,
wherein the control apparatus is a control apparatus according to claim 1.

11. An electric vehicle, comprising:
an internal combustion engine which drives either of front or rear wheels;
an AC motor which drives the other wheels;
an on board power supply;
a power converter which converts into alternating current power the direct current power supplied from said on board power supply and supplies the alternating current power to the AC motor; and
a control apparatus which controls the power converter,
wherein the control apparatus is a control apparatus according to claim 1.

12. An electric vehicle, comprising:
an AC motor which drives wheels;
an on board power source;
a power converter which converts into alternating current power direct current power supplied from said on board power supply and supplies the alternating current power to the AC motor; and
a control apparatus which controls the power converter,
wherein the control apparatus is a control apparatus according to claim 2.

13. An electric vehicle, comprising:
an AC motor which drives wheels;
an on board power source;
a power converter which converts into alternating current power direct current power supplied from said on board power supply and supplies the alternating current power to the AC motor; and
a control apparatus which controls the power converter,
wherein the control apparatus is a control apparatus according to claim 3.

14. An electric vehicle, comprising:
an AC motor which drives wheels;
an on board power source;
a power converter which converts into alternating current power direct current power supplied from said on board power supply and supplies the alternating current power to the AC motor; and
a control apparatus which controls the power converter,
wherein the control apparatus is a control apparatus according to claim 4.

15. An electric vehicle, comprising:
an AC motor which drives wheels;
an on board power source;
a power converter which converts into alternating current power direct current power supplied from said on board power supply and supplies the alternating current power to the AC motor; and
a control apparatus which controls the power converter,
wherein the control apparatus is a control apparatus according to claim 5.

16. An electric vehicle, comprising:
an AC motor which drives wheels;
an on board power source;
a power converter which converts into alternating current power direct current power supplied from said on board power supply and supplies the alternating current power to the AC motor; and
a control apparatus which controls the power converter,
wherein the control apparatus is a control apparatus according to claim 6.

17. An electric vehicle, comprising:
an AC motor which drives wheels;
an on board power source;
a power converter which converts into alternating current power direct current power supplied from said on board power supply and supplies the alternating current power to the AC motor; and
a control apparatus which controls the power converter,
wherein the control apparatus is a control apparatus according to claim 7.

18. An electric vehicle, comprising:
an AC motor which drives wheels;
an on board power source;
a power converter which converts into alternating current power direct current power supplied from said on board power supply and supplies the alternating current power to the AC motor; and
a control apparatus which controls the power converter,
wherein the control apparatus is a control apparatus according to claim 8.

19. An electric vehicle, comprising:
an AC motor which drives wheels;
an on board power source;
a power converter which converts into alternating current power direct current power supplied from said on board power supply and supplies the alternating current power to the AC motor; and
a control apparatus which controls the power converter,
wherein the control apparatus is a control apparatus according to claim 9.

20. An electric vehicle, comprising:
an internal combustion engine which drives either of front or rear wheels;
an AC motor which drives the other wheels;
an on board power supply;
a power converter which converts into alternating current power the direct current power supplied from said on board power supply and supplies the alternating current power to the AC motor; and
a control apparatus which controls the power converter,
wherein the control apparatus is a control apparatus according to claim 2.

21. An electric vehicle, comprising:
an internal combustion engine which drives either of front or rear wheels;
an AC motor which drives the other wheels;
an on board power supply;
a power converter which converts into alternating current power the direct current power supplied from said on board power supply and supplies the alternating current power to the AC motor; and
a control apparatus which controls the power converter,
wherein the control apparatus is a control apparatus according to claim 3.

22. An electric vehicle, comprising:
an internal combustion engine which drives either of front or rear wheels;
an AC motor which drives the other wheels;
an on board power supply;
a power converter which converts into alternating current power the direct current power supplied from said on board power supply and supplies the alternating current power to the AC motor; and
a control apparatus which controls the power converter,
wherein the control apparatus is a control apparatus according to claim 4.

23. An electric vehicle, comprising:
an internal combustion engine which drives either of front or rear wheels;
an AC motor which drives the other wheels;
an on board power supply;
a power converter which converts into alternating current power the direct current power supplied from said on board power supply and supplies the alternating current power to the AC motor; and
a control apparatus which controls the power converter,
wherein the control apparatus is a control apparatus according to claim 5.

24. An electric vehicle, comprising:
an internal combustion engine which drives either of front or rear wheels;
an AC motor which drives the other wheels;
an on board power supply;
a power converter which converts into alternating current power the direct current power supplied from said on board power supply and supplies the alternating current power to the AC motor; and
a control apparatus which controls the power converter,
wherein the control apparatus is a control apparatus according to claim 6.

25. An electric vehicle, comprising:
an internal combustion engine which drives either of front or rear wheels;
an AC motor which drives the other wheels;
an on board power supply;
a power converter which converts into alternating current power the direct current power supplied from said on board power supply and supplies the alternating current power to the AC motor; and
a control apparatus which controls the power converter,
wherein the control apparatus is a control apparatus according to claim 7.

26. An electric vehicle, comprising:
an internal combustion engine which drives either of front or rear wheels;
an AC motor which drives the other wheels;
an on board power supply;
a power converter which converts into alternating current power the direct current power supplied from said on board power supply and supplies the alternating current power to the AC motor; and
a control apparatus which controls the power converter,
wherein the control apparatus is a control apparatus according to claim 8.

27. An electric vehicle, comprising:
an internal combustion engine which drives either of front or rear wheels;
an AC motor which drives the other wheels;
an on board power supply;
a power converter which converts into alternating current power the direct current power supplied from said on board power supply and supplies the alternating current power to the AC motor; and
a control apparatus which controls the power converter,
wherein the control apparatus is a control apparatus according to claim 9.

* * * * *